S. C. FOSTER.
COMBINED CHART AND BLACKBOARD.
APPLICATION FILED NOV. 9, 1920.

1,432,175.

Patented Oct. 17, 1922.

Inventor:
Selden C. Foster;
by S. W. Bates
Atty.

Patented Oct. 17, 1922.

1,432,175

UNITED STATES PATENT OFFICE.

SELDEN C. FOSTER, OF NORWAY, MAINE.

COMBINED CHART AND BLACKBOARD.

Application filed November 9, 1920. Serial No. 422,767.

*To all whom it may concern:*

Be it known that I, SELDEN C. FOSTER, a citizen of the United States, residing at Norway, in the county of Oxford and State of Maine, have invented certain new and useful Improvements in Combined Charts and Blackboards, of which the following is a specification.

My invention relates to a chart for teaching the words of English or any other language and is particularly adapted for the use of teachers in the lower grade schools.

Children are usually taught from books and charts, and more commonly with the use of the blackboard upon which words are written or printed in chalk by the teacher.

The use of the blackboard in teaching words involves a great deal of work on the part of the teacher and the object of my invention is to eliminate this work as far as possible by supplying permanent word combinations or characters printed in permanent form with means by which they can conveniently be brought to the sight of the pupils as required, thus saving the teacher much work in forming and erasing letter combinations, phonograms and words upon the blackboard.

My chart in its more practicable form, consists essentially of a pair of disks superposed one over the other and centrally pivoted. The inner disk is preferably of larger diameter than the outer disk and they are preferably connected with a central pivot or spindle so that the rotation of the outer disk will not disturb the inner disk.

Upon the inner disk are letters or other characters preferably printed in permanent form arranged in the form of concentric circles and in the outer disk are openings which register with the several circles traced on the inner disk.

Adjacent to these openings are blackboard surfaces upon which may be written erasible figures or letters by which combinations may be made with the letters or characters inscribed on the inner disk.

I also preferably make use in my chart of covers which may be temporarily placed over these openings so that one opening alone may be made visible to the pupil if desired.

By this arrangement which is substantially a combination of the blackboard and the permanent chart much work is saved the teacher in making various combinations of letters to produce words for the instruction and drilling of pupils.

In the accompanying drawing I have illustrated my invention in the form in which I prefer to construct it but I desire it to be understood that the general form of the device may be greatly varied and particularly the arrangement of figures and letters thereon may be varied to carry out various teaching systems or ideas.

Referring to the drawing.

Figures 1, 2:
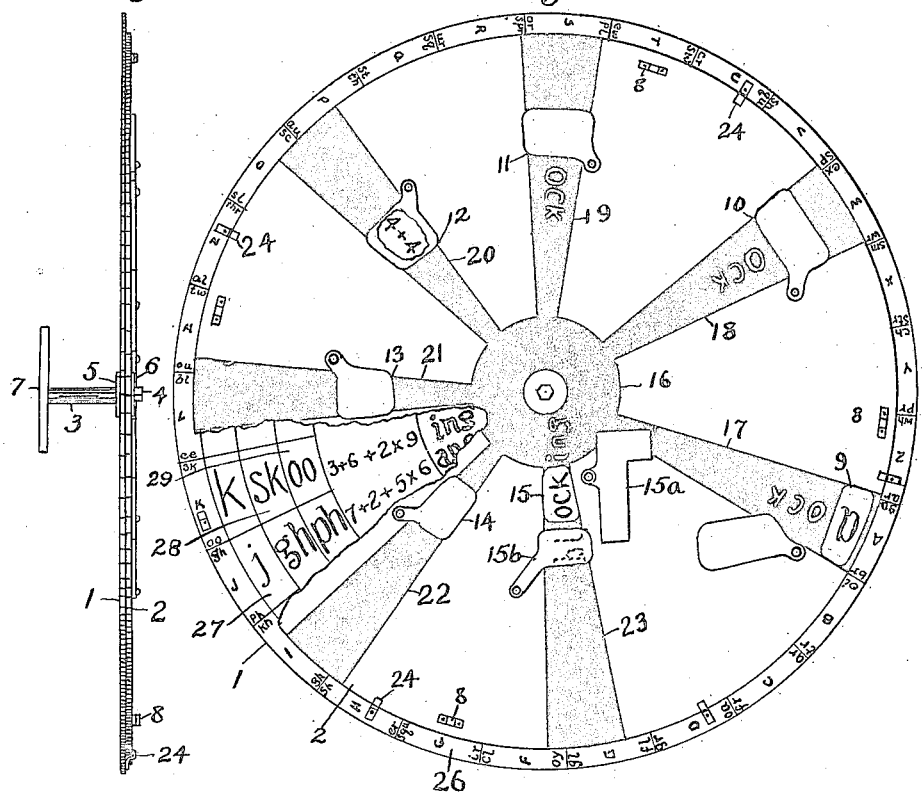
Fig. 1 is a front elevation with a portion cut away.
Fig. 2 is a side or edge elevation.

The device consists of a pair of disks 1 and 2 of suitable thin material such as pulp board, leather board or the like, centrally pivoted to a spindle 3 connected with a suitable bracket 7 designed to be secured to the wall or any other fixed support. The disks are pivoted one over the other to the spindle 3 and are held in frictional engagement by a binding screw 4 and washers 5 and 6.

These washers may be of any suitable form to create more or less friction between the inner disk 1 and the spindle and between the head of the binding screw 4 and the outer disk 2.

The frictional engagement is designed to be such that the turning of the outer disk 2 on the inner disk 1 will have no effect in moving the disk 1 since the friction of the disk 1 with the spindle is greater than the friction of the disk 2 with the disk 1.

Thus, the outer disk can be turned freely without movement of the inner disk by means of projections 8 attached to the outer disk and if it is desired to change the position of the inner disk its edge may be seized by the hand and turned to any desired position.

The diameter of the outer disk is somewhat less than that of the inner disk leaving exposed an outer rim 26 which is utilized as an index to show the character of the letters or figures printed or otherwise formed on the inner disk.

The permanent characters formed on the disk as herein shown, are arranged to carry out a system of instruction which I consider particularly useful in saving labor for the teacher but other arrangements may be used in connection with my apparatus.

As here shown, the inner disk is arranged with a series of concentric circles beginning at the outer edge and extending inward toward the center.

The outer circle 27 which is just inside the edge of the outer disk is divided into 26 parts and contains all the letters of the alphabet. The next two circles 29 and 28 contain letter combinations, usually two in number which combine with various word roots.

These letter combinations are arranged radially in line with the letters of the alphabet in circle 27 and each letter of the alphabet occupies a section of the entire circle with the letter combination which accompanies it in the corresponding section.

In the index ring 26 opposite each letter is found the letter preferably printed in smaller size and at each end of the section occupied by the letter is found one of the two letter combinations accompanying the alphabet letter.

Thus, opposite the letter k toward the center, is the letter combination sk in the circle 28 and the combination oo in the circle 29. These three characters k, sk and oo are found in the index ring opposite the section with the letter k in the center and sk and oo at the extreme ends of the section of the index ring.

Other letters and other word combinations of which all are not shown, occupy the outer portion of the inner disk and the circles 27, 28, and 29.

Within the three outer circles mentioned are figures arranged in three concentric circles connected by the signs of addition and multiplication all in radial lines and on the inside of these circles is a central circular space devoted to phonograms or word terminations.

The outer disk is arranged with openings which register as the disk is turned with the concentric circles as thus described. These openings as herein shown are 7 in number beginning at the outer edge and gradually approaching the center. They are distributed radially around the circle. The opening 9 is opposite the outer circle 27, the opening 10 opposite the second circle 28, the opening 11 registers with the circle 29. The opening 9 corresponds to the letters of the alphabet and the two openings 10 and 11 correspond to the letter combinations which accompany them.

The next three openings 12, 13 and 14 register with the three circles indicating numbers and the opening 15 registers with the inner circle containing phonograms or word terminals.

Each one of these openings which is approximately the width of the circle is provided with a cover preferably pivoted to the body of the disk in such a way that it can easily be swung aside to cover or uncover the opening as the progress of the instruction makes necessary.

Adjacent to each of these openings there is a blackboard surface or surface capable of receiving erasible figures.

In practice, I have formed a comparatively large circular central space 16 with a blackboard surface with radial strips 17, 18, 19, 20, 21, 22, and 23 embracing each of the openings and extending from the central surface 16 to the edge of the disk.

The surface which I have termed for convenience a "blackboard surface" is formed of any suitable paint or material capable of receiving erasible figures preferably of crayon such as used in schools.

The two disks are held together and in close relation by clips 24 secured to the rim 26 and extending over the outer edge of the disk 2.

Many ways of using the chart and making use of the blackboard feature will suggest themselves to a teacher but I will here give a simple example to illustrate one of the many uses to which it may be put.

The phonogram "ock" is written in chalk on surface 17, 18, and 19 extending in toward the center from openings 9, 10, and 11. The disk 2 is now rotated until the opening 9 comes opposite the letter "r" and the pupil reads the word "rock." The cover of opening 9 may be left open or closed as desired and the opening 10 which is on the second circle 28 is swung to the combination "bl" which is also on the circle 28 in connection with the letter "l" as indicated on the index margin, thus making the word "block."

The opening 11 which is on the third circle 29 is now turned to the letters "st" making the word "stock."

These words may be pronounced by the pupil and read as easily as corresponding words put on a blackboard. The next three openings 12, 13, and 14 which cover the next three circles are used to show two figures at a time on one or the other of the circles and these figures may be added or multiplied and the answer put in chalk on the blackboard surface or indicated in any suitable way.

Other figures may be written on the blackboard surface either preceding or following the exposed printed figures, much blackboard work being thus saved the teacher.

The inner circle covered by the opening 15 has phonograms usually of three letters including such combinations as "ing" "and" "ear" "ock" etc. are used by writing suitable letters or letter combinations before or after the printed letters. The cover 15$^a$ is designed to extend over the opening 15 and inward toward the center over the blackboard space and the cover 15$^b$ is intended to swing down to cover any written letters which may be placed before the opening 15.

Letters may be placed before the opening and after the opening as illustrated in the drawing where the word "blocking" is formed, and in this way words of three syllables may be produced.

It is evident that a great variety of combinations may be made and used with the chart as indicated or the apparatus may be simplified to use with a less extensive range of combinations.

The chart is designed to be fastened up in a vertical position but it may, if desired be used in a horizontal position and secured to a low table.

I claim:

1. A teaching chart consisting of a fixed support, a pair of disks superposed one on the other and concentrically pivoted on said support, the inner disk having permanent characters thereon arranged in concentric circles, the outer disk having openings located in said concentric circles and adapted to register with said characters, said disks being rotatable on said pivot with relation to each other, the outer disk having a surface of blackboard material.

2. A teaching chart consisting of a fixed support, a pair of disks superposed one on the other and concentrically pivoted on said support, the inner disk having permanent characters thereon arranged in concentric circles, the outer disk having openings located in said concentric circles and adapted to register with said characters, said disks being rotatable on said pivot with relation to each other, the surface of the outer disk having a series of radial strips of black board material embracing said openings.

3. A chart for teaching words, consisting of a pair of centrally pivoted superposed disks, the inner disk of larger diameter than the outer disk forming an outer index rim, characters inside of said outer index rim and corresponding characters in radial line with the same on said rim, openings in said outer disk adapted to register with said characters and blackboard surfaces adjacent to said openings.

4. In a chart for teaching words, a pair of centrally pivoted superposed disks, the inner disks having thereon a series of concentric circles, the outer circle containing all the letters of the alphabet, the inner circles containing letter combinations or word elements with an opening in the outer disk adapted to register with each of said circles to bring said word combinations and alphabet in sight and blackboard surfaces adjacent to each of said openings.

5. A chart for teaching words, consisting of two superposed and centrally pivoted disks, the inner disk of greater diameter than the outer disk forming an outer index rim, three concentric circles on said inner disk adjacent to said rim, the outer said circle containing the letters of the alphabet, the other circles containing letter combinations or word elements, the said index ring containing the same letters contained on the said concentric rings and located radially opposite the same.

SELDEN C. FOSTER.